US009558735B2

(12) United States Patent
Roberts et al.

(10) Patent No.: US 9,558,735 B2
(45) Date of Patent: *Jan. 31, 2017

(54) SYSTEM AND METHOD FOR SYNTHETICALLY GENERATED SPEECH DESCRIBING MEDIA CONTENT

(71) Applicant: AT&T INTELLECTUAL PROPERTY I, LP, Atlanta, GA (US)

(72) Inventors: Linda Roberts, Boynton Beach, FL (US); Hong Thi Nguyen, Atlanta, GA (US); Horst J Schroeter, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,362

(22) Filed: Mar. 18, 2016

(65) Prior Publication Data

US 2016/0203815 A1 Jul. 14, 2016

Related U.S. Application Data

(63) Continuation of application No. 14/481,326, filed on Sep. 9, 2014, now Pat. No. 9,324,317, which is a
(Continued)

(51) Int. Cl.
| | | |
|---|---|---|
| G10L 13/00 | (2006.01) | |
| G10L 13/08 | (2013.01) | |
| G10L 13/04 | (2013.01) | |
| G10L 13/033 | (2013.01) | |
| G06F 17/28 | (2006.01) | |
| G10L 13/10 | (2013.01) | |
| G06F 3/01 | (2006.01) | |
| G06F 3/0484 | (2013.01) | |
| G06F 3/16 | (2006.01) | |

(52) U.S. Cl.
CPC .............. *G10L 13/04* (2013.01); *G06F 3/017* (2013.01); *G06F 3/04842* (2013.01); *G06F 3/167* (2013.01); *G06F 17/289* (2013.01); *G10L 13/00* (2013.01); *G10L 13/033* (2013.01); *G10L 13/043* (2013.01); *G10L 13/086* (2013.01); *G10L 13/10* (2013.01); *G10L 2013/083* (2013.01)

(58) Field of Classification Search
USPC .................................................. 704/231–275
See application file for complete search history.

(56) References Cited

U.S. PATENT DOCUMENTS

| | | |
|---|---|---|
| 5,819,220 A | 10/1998 | Sarukkai et al. |
| 6,446,041 B1 | 9/2002 | Reynar et al. |

(Continued)

*Primary Examiner* — Jesse Pullias

(57) ABSTRACT

Disclosed herein are systems, methods, and computer readable-media for providing an automatic synthetically generated voice describing media content, the method comprising receiving one or more pieces of metadata for a primary media content, selecting at least one piece of metadata for output, and outputting the at least one piece of metadata as synthetically generated speech with the primary media content. Other aspects of the invention involve alternative output, output speech simultaneously with the primary media content, output speech during gaps in the primary media content, translate metadata in foreign language, tailor voice, accent, and language to match the metadata and/or primary media content. A user may control output via a user interface or output may be customized based on preferences in a user profile.

20 Claims, 4 Drawing Sheets

Related U.S. Application Data continuation of application No. 12/134,714, filed on Jun. 6, 2008, now Pat. No. 8,831,948.

(56) References Cited

U.S. PATENT DOCUMENTS

| | | |
|---|---|---|
| 6,609,096 B1 | 8/2003 | DeBonet |
| 7,010,489 B1 | 3/2006 | Lewis et al. |
| 7,356,470 B2 | 4/2008 | Dunn et al. |
| 7,372,993 B2 | 5/2008 | Lagardere et al. |
| 7,831,432 B2 | 11/2010 | Bodin et al. |
| 8,831,948 B2 | 9/2014 | Schroeter et al. |
| 2001/0027396 A1 | 10/2001 | Sato et al. |
| 2001/0031066 A1 | 10/2001 | Meyer et al. |
| 2003/0200858 A1 | 10/2003 | Xie et al. |
| 2005/0177358 A1 | 8/2005 | Melomed et al. |
| 2005/0286743 A1 | 12/2005 | Kurzweil et al. |
| 2007/0033005 A1 | 2/2007 | Cristo et al. |
| 2009/0006097 A1 | 1/2009 | Etezadi et al. |

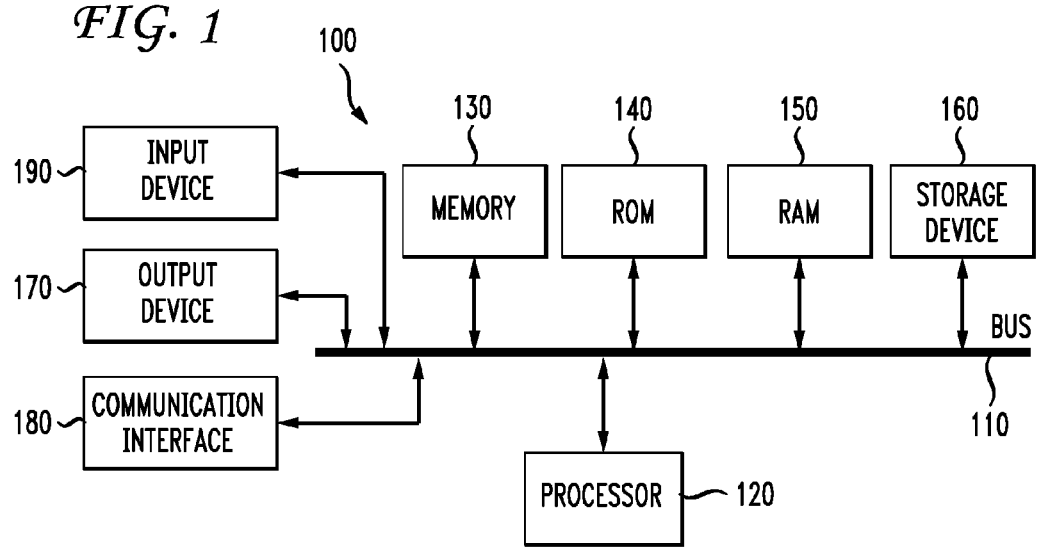
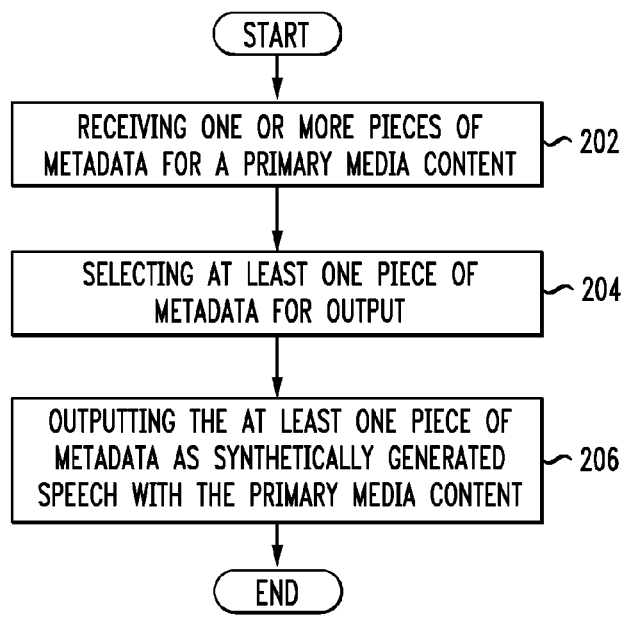

SYSTEM AND METHOD FOR SYNTHETICALLY GENERATED SPEECH DESCRIBING MEDIA CONTENT

CROSS-REFERENCE TO RELATED APPLICATIONS

The present application is a continuation of U.S. patent application Ser. No. 14/481,326, filed Sep. 9, 2014, which is a continuation of U.S. patent application Ser. No. 12/134,714, filed Jun. 6, 2008. The contents of the foregoing are incorporated herein by reference in their entirety.

FIELD OF THE DISCLOSURE

The present invention relates to outputting metadata and more specifically to speech synthesis acting to introduce or identify media selections.

BACKGROUND OF THE DISCLOSURE

Media is pervasive in our society. People encounter media broadcast over traditional AM and FM formats as well as satellite radio and internet radio streams. Digital audio players, such as the Apple iPod™, allow people to bring their entire music library with them and listen to it virtually anywhere. Other electronic devices allow for songs, movies, audio books, and other media to be consumed in any format and any location. Consuming media in new locations brings new problems. For example, a person driving while listening to an mp3 player connected via Bluetooth to a car stereo is unable to view the display of the mp3 player while driving, at least not safely, to see who is performing the song or the name of the song. Similarly, music streamed to an XM satellite receiver can be brought out in the yard while gardening so the person listening cannot see the display. Bringing media to new locations means that often a listener is unable to quickly or safely determine information about a particular song that is playing.

The problem of not knowing what song or video clip is playing is addressed partially by live Disk Jockeys, or DJs. A live DJ announces selected information about one or more songs before or after playback. One of the problems with live DJs is that listeners never know when the next DJ announcement will be, so it is unsuitable for listeners who have a short attention span or are unable to focus their memory and wait until the next DJ announcement; that is, live DJs cannot provide on-demand information about a particular song to a user. Another problem with live DJs is that not every song is announced or not all available data about the song is announced. Often a live DJ will simply state the artist and song name, neglecting to mention other information, such as the album, the release date, chart ranking, to say nothing of individual user rankings which are completely beyond the scope of a live DJ to provide for each, individual listener.

These problems also exist to some extent for blind or visually impaired listeners. A blind listener has no way to read the metadata on a screen even if it were displayed.

Radio stations often have contractual obligations to announce song information a certain, minimum number of times. Live DJs are imperfect people and may forget or refuse to announce at the contractually designated level, exposing their employers to contractual liability.

Accordingly, what is needed in the art is a way to identify information about media content without distracting the listener's attention unnecessarily.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable-media for providing an automatic synthetically generated voice describing media content, the method comprising receiving one or more pieces of metadata for a primary media content, selecting at least one piece of metadata for output, and outputting the at least one piece of metadata as synthetically generated speech with the primary media content. Other aspects of the invention use alternative output, output speech simultaneously with the primary media content, output speech during gaps in the primary media content, translate metadata in foreign language, tailor voice, accent, and language to match the metadata and/or primary media content. A user may control output via a user interface or output may be customized based on preferences in a user profile.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 1 illustrates an example system embodiment;

FIG. 2 illustrates an exemplary method embodiment;

DETAILED DESCRIPTION OF THE DRAWINGS

Figure 3:
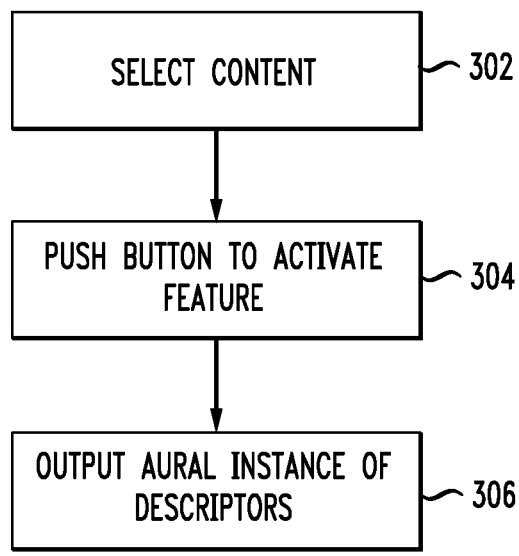
FIG. 3 illustrates a simple flow chart of how a user might interface with an example system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

FIG. 2 illustrates an exemplary method embodiment. First, the method receives one or more pieces of metadata for media content (202). Media includes audio, video, and multimedia content. The method may be applied to internet radio, digital terrestrial radio, a digital audio player, streaming internet radio, or any other way to serially play media where metadata describing the media is available. Metadata may be stored or streamed with the media itself or as a companion file or metadata may be retrieved from an external source, such as CDDB or freedb.

Second, the method selects at least one piece of metadata for output (204). In one aspect, a user controls output of the at least one piece of metadata through a user interface. The user selects one or more pieces of metadata at the time of the request or can establish preferences and/or settings in a user profile for which pieces of metadata are output and the frequency of output. For example, a user can set a preference for just the song title and artist or for artist, album, and year. One variation allows the user to request output of the metadata immediately (i.e. on demand), during the media playback, immediately preceding the media playback, immediately following the media playback, or at a regular interval. One example of a regular interval in the context of an mp3 player is to set a preference for announcing the artist and song title every 5 songs. So after every five songs, the mp3 player pauses and announces the songs audibly, much like a DJ would. Where an mp3 player knows the next song to be played, it may also be announced. An example speech output in a scenario where announcing is set for every five songs is "You just heard Soak Up the Sun by Sheryl Crow, High on the Mountain Top performed by The Mormon Tabernacle Choir, Katamari on the Rocks by Yu Miyake, Achy Breaky Heart by Billy Ray Cyrus, and Say You'll Be There by the Spice Girls. Up next is Poezd v Ogne by Boris Grebenshnikov". A user may alternatively request immediate output. The immediate output is useful for scenarios where a user hears a song on satellite radio and wants to know who sings it without waiting for the end of the song where the DJ may or may not announce the artist. In that case a user simply pushes a button, makes an oral requests, gestures, or performs some other kind of user input action to request immediate output.

In some business scenarios, contractual or licensing obligations require a floor or minimum required level of announcing the song titles and artists. For example, the RIAA may require a radio station to announce song and artist information at least once every 5 songs. When a user pushes the button to hear the current song title and artist, that announcement counts toward the radio station's contractual obligation and may reset the count of songs since the last announcement. Alternatively, an automatic setting to announce the songs periodically may be used to ensure automatic compliance with a minimum announcement frequency agreement.

Third, the method outputs the at least one piece of metadata as synthetically generated speech with the primary media content (206). In one aspect, the synthetically generated speech is output simultaneously with the primary media content. The speech may be output loudly over the existing media playback, or the existing media playback may be muted or set at a reduced volume while the speech is played back. In cases where cache or other storage is available or where the media is stored locally (not streamed), the content may be paused while the speech is played back. The speech may also be played back during gaps in the media content, such as between songs, where a live DJ would interject and announce the songs just played and/or the upcoming songs.

In one aspect, the method includes additional steps of determining whether the metadata is in a foreign language and translating the metadata to another language before output. This is useful where Unicode metadata is available which may store metadata in foreign languages. A user profile may store information such as native or preferred languages for translation or a user profile may store a preference to never translate metadata recorded in foreign languages.

In another aspect of speech output the quality, tone, speed, pitch, prosody, accent, type of voice, language, lexicon, and/or other qualities of the speech may be varied based on some or all of the metadata and/or the primary media content. For example, in the sample text above, a song like Katamari on the Rocks by Yu Miyake is announced by an adult female voice in Japanese with a Tokyo accent, Achy Breaky Heart by Billy Ray Cyrus is announced by a young adult male voice in English with a Texas drawl, and Say You'll Be There by the Spice Girls is announced by a teenaged female voice in English with a British accent. In one aspect, the media is also analyzed to determine tone and/or prosody characteristics which indicate a language, accent, speaker gender, etc.

One aspect involves alternative output. In situations where a user is driving, the user may not be able to look at the screen of the mp3 player connected via Bluetooth to the car stereo, but may desire to view the artist and song title. In that case, one alternative output is displaying it on the car stereo screen or projecting the information onto the windshield or other heads-up display. In the case of a user working in the yard and listening to satellite radio, the only nearby display may be a cellular phone. Another alternative output involves phone.

FIG. 3 illustrates a simple flow chart of how a user might interface with an example system embodiment as an mp3 player. First, the user selects content to play 302. The content may include a playlist, a randomly selected song, etc. When the user desires to hear metadata about the song, the user pushes a button to activate the features 304. The button push is exemplary and may be replaced by any other suitable activation user interaction such as a switch, an oral command, a gesture, a mouse click, other tactile input, etc. When the user presses the button, the example embodiment outputs the aural instance of the metadata or descriptors. This may be done without embellishment, one example of which is "Let It Be, Beatles". It may be done with embellishment and/or exposition. An extreme example of embellishment and/or exposition is "You are listening to Let It Be, the title track of the album Let It Be. It is performed by the Beatles and written by Paul McCartney. Let It Be was released in 1970 and was a number 1 hit in five countries." Embellishment does not necessarily relate to the current media. In one aspect, embellishment includes small talk about recent events or weather or announcements about traffic or other hazards. Embellishment information may be obtained through a purpose-built database stored locally or in a network or may be gleaned from external network sources, such as RSS feeds. Governmental announcements such as Amber Alerts or a change in the Homeland Security Threat Level may be interspersed with embellishments regarding media and may be prerecorded or generated.

Much like a live DJ, embellishment may be provided during the beginning and/or ending portions of a song. Analysis may be performed on the song to determine which portions of a song or other media are introductory or do not contain vocals. In one aspect, embellishments and/or exposition are added during all or part of the introductory portion of the song or where the singer has not yet started singing. The next song may be announced starting during the ending portion of the current song after the vocals have concluded and continuing on into the beginning of the next song.

Figure 4:
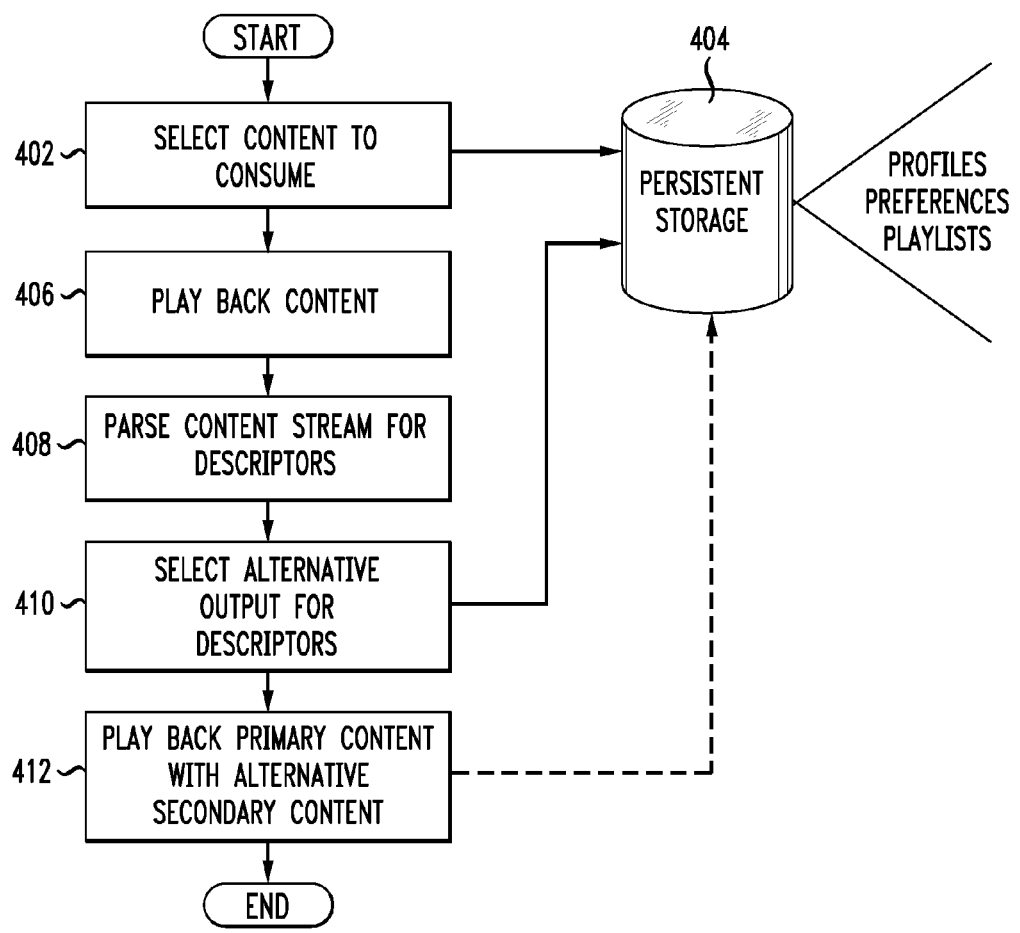
FIG. 4 illustrates an exemplary system including user profiles.

FIG. 4 illustrates an exemplary system including user profiles. First, the user selects content to consume 402. This may be selecting a playlist on an iPod, choosing a channel on XM satellite radio, or starting an audio stream on the Internet. As the content is selected, persistent storage 404 is accessed to retrieve profiles, preferences, and/or playlists governing playback and the automatic DJ-like features. Next, the content is played back 406. As the content is playing, the content stream is parsed for descriptors 408 such as metadata. Other metadata information may be pulled from persistent storage or other storage locations, across a network or local. An alternative output is selected for descriptors 410 such as speech, display on a cellular phone, or other output devices. This step may access the persistent storage for personalized metadata, such as a favorite ranking (similar to how iTunes allows users to rate a song from 1 to 5 stars), playlist information, or any other custom metadata the user stores that is connected to the media content. Last, the primary content is played back with the alternative secondary content. The two may be played over one another simultaneously or one may be paused while the other plays, etc. Preferences and settings governing playback of the two and how they interact may be stored in a profile in the persistent storage. The persistent storage and profile may be stored locally, in one or more servers, or both.

Speech may be generated, prerecorded, or some combination. For example, commonly used artists or song names may be prerecorded and used in conjunction with text-to-speech (TTS) systems to synthesize speech to provide embellishments and/or exposition on the fly. TTS systems are known in the art and are continually being improved through research such as the research conducted in AT&T Labs. Any currently known or yet-to-be-developed way to generate speech may be adapted for use with this invention.

Figure 5:
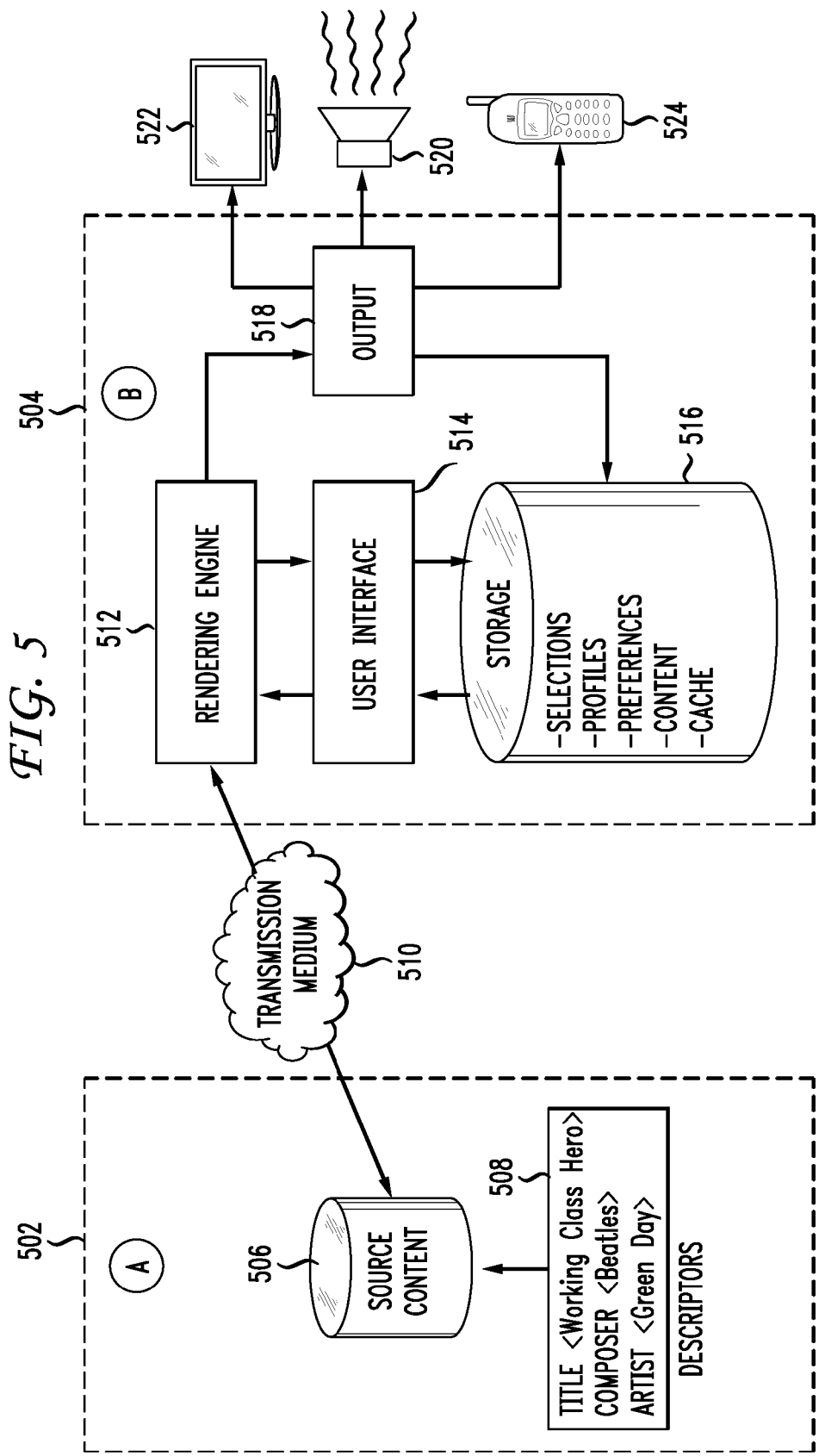
FIG. 5 illustrates another exemplary system including alternative embodiments.

FIG. 5 illustrates another exemplary system including alternative embodiments. Portions A 502 and B 504 are illustrated separately but may be combined or may be partially combined. They may be combined physically while remaining conceptually separate or may be implemented as a monolithic "black box" which simply receives inputs and transmits outputs. First, a user selects media to play from the source content 506. The user may not actually select each individual song or movie clip, but may choose to tune into a broadcast or stream. The source content retrieves descriptors 508 including metadata embedded in the media, metadata associated with the media in a database, or metadata retrieved from storage sources across a wired or wireless network. The source content and descriptors are sent via a transmission medium 510 to the rendering engine 512. The rendering engine may be stand-alone or distributed over multiple locations. The transmission medium can be wired or wireless. The rendering engine interacts with the user interface 514 to determine how to assemble the output based on the metadata and the source content. The user interface interacts with a storage database containing selections, profiles, preferences, cached alternative outputs (for descriptors for media that are frequently requested), etc. The user interface hands information and control signals to the rendering engine, which sends its results to the output 518 device. The rendering engine may include a speech synthesis module or other modules to convert the descriptors to alternative output. The output is coordinated and sent to the proper device such as a speaker 520 (standalone or integrated into another device), television or other display 522, or cellular phone 524 including any associated wireless headsets.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in satellite radio, internet radio, digital terrestrial radio, dedicated digital audio players, digital audio players integrated with other devices, etc. Those skilled in the art will readily recognize various modifications and changes that may be made to the present invention without following the example embodiments and applications illustrated and described herein, and without departing from the true spirit and scope of the present invention.

What is claimed is:

1. A method comprising:
   accessing, by a system including a processor, user input that was captured during a presentation of media content, wherein the user input comprises a metadata request associated with the media content;
   obtaining, by the system according to the metadata request, metadata for output; and
   outputting, by the system, synthetically generated speech associated with the media content during an audio gap in the presentation of the media content, the synthetically generated speech having an accent selected from a plurality of accents based on the metadata.

2. The method of claim 1, wherein the synthetically generated speech has a language, a lexicon, or a combination thereof selected from a plurality of languages, lexicons or combinations thereof according to a user profile.

3. The method of claim 1, wherein the user input comprises a gesture.

4. The method of claim 1, wherein the user input comprises an oral command.

5. The method of claim 1, wherein the outputting of the synthetically generated speech is based on a user profile.

6. The method of claim 1, wherein the media content comprises a group of songs, and wherein the audio gap is in-between songs of the group of songs.

7. The method of claim 1, further comprising analyzing the media content to determine tone and prosody which indicate the accent.

8. The method of claim 1, wherein the obtaining of the metadata is based on a selection from among a group of metadata received by the system with the media content.

9. The method of claim 1, wherein the obtaining of the metadata is based on a selection from among a group of metadata stored by the system.

10. The method of claim 1, wherein the obtaining of the metadata is based on a selection from among a group of metadata accessed by the system from a remote metadata source.

11. The method of claim 1, further comprising:
    determining the metadata is in a foreign language, wherein the accent corresponds to the foreign language; and
    translating the metadata to another language from the foreign language before output.

12. A system comprising:
    a processor; and
    a computer-readable storage medium having instructions stored which, when executed by the processor, cause the processor to perform operations comprising:
       receiving a gesture from a user during a presentation of media content, wherein the gesture comprises a metadata request associated with the media content;
       accessing a group of metadata from a source that is different from the source of the media content;
       selecting, according to the metadata request, metadata from the group of metadata; and
       outputting synthetically generated speech according to the metadata during an audio gap in the presentation of the media content, the synthetically generated speech having an accent, a language, a lexicon, or a combination thereof selected from a plurality of accents, languages, lexicons or combinations thereof.

13. The system of claim 12, wherein the gesture is accompanied by an oral command.

14. The system of claim 12, wherein the outputting of the synthetically generated speech is based on a user profile.

15. The system of claim 12, wherein the source of the metadata is a local storage accessible to the processor.

16. The system of claim 12, wherein the source of the metadata is a remote storage accessible to the processor.

17. A computer-readable storage device having instructions stored which, when executed by a computing device, cause the computing device to perform operations comprising:
   receiving a gesture from a user during a presentation of media content, wherein the gesture comprises a metadata request associated with the media content;
   selecting, according to the metadata request, metadata from a group of metadata;
   accessing a user profile for the user; and
   outputting synthetically generated speech according to the metadata and the user profile during an audio gap in the presentation of the media content, the synthetically generated speech having an accent, a language, a lexicon, or a combination thereof selected from a plurality of accents, languages, lexicons or combinations thereof.

18. The computer-readable storage device of claim 17, wherein the operations further comprise accessing the group of metadata from a source that is different from the source of the media content.

19. The computer-readable storage device of claim 18, wherein the source of the metadata is a remote storage accessible to the computing device.

20. The computer-readable storage device of claim 18, wherein the source of the metadata is a local storage accessible to the computing device.

* * * * *